United States Patent [19]

Langen et al.

[11] Patent Number: 5,012,728
[45] Date of Patent: May 7, 1991

[54] INJECTION NEEDLES FOR INJECTING BRINE AND THE LIKE INTO MEAT

[75] Inventors: Jacobus J. Langen, Rexdale; John H. J. Langen; Bernard A. Langen, both of Brampton, all of Canada

[73] Assignee: H. J. Langen & Sons Limited, Mississauga, Canada

[21] Appl. No.: 345,770

[22] Filed: May 1, 1989

[51] Int. Cl.⁵ .................. B02B 3/12; B02B 23/00
[52] U.S. Cl. ........................ 99/533; 99/472; 99/535
[58] Field of Search ............ 99/494, 532, 533, 535, 99/516, 472; 69/30; 17/25, 51; 426/281; 27/24.1, 24.2

[56] References Cited

U.S. PATENT DOCUMENTS

| | | | |
|---|---|---|---|
| 2,656,785 | 10/1953 | Gannon et al. | 99/532 |
| 3,080,809 | 3/1963 | Harris et al. | 99/532 |
| 3,677,169 | 7/1972 | Francis | 99/533 |
| 4,036,122 | 7/1977 | Langen | 17/25 |
| 4,356,762 | 11/1982 | Langen | 99/535 |
| 4,437,397 | 3/1984 | Kawai | 99/533 |

FOREIGN PATENT DOCUMENTS

3084438  4/1988  Japan ...................... 99/532

*Primary Examiner*—Timothy F. Simone
*Attorney, Agent, or Firm*—Fetherstonhaugh & Co.

[57] ABSTRACT

An injection needle assembly for injecting a fluid into a meat product comprises an injection needle which has a proximal end and a distal end and a bore which extends from the proximal end to the distal end. A discharge passage opens through the needle from the bore at the distal end of the needle. A valve member is slidably mounted on the needle for movement relative to the needle between a first position in which it closes the discharge passage to retain fluid within said needle and a second position in which it opens the discharge passage to permit fluid to be discharged therethrough into the meat in use.

19 Claims, 3 Drawing Sheets

INJECTION NEEDLES FOR INJECTING BRINE AND THE LIKE INTO MEAT

FIELD OF INVENTION

This invention relates to meat curing machines in which a fluid is injected into meat products.

BACKGROUND OF INVENTION

Needle injector assemblies which are used for the purposes of injecting fluid into meat products are well known and one such device is described in U.S. Pat. No. 4,356,762, Christianus P. Langen, dated Nov. 2, 1982. In this device, the fluid is injected through the injection needles which are open at their distal end. Because the needles are open at their distal end, all of the fluid which is located within the bore of the needle will escape into the curing chamber when the piece of meat falls off of the needle as the curing chamber is rotated. As a consequence, a substantial proportion of the fluid which is injected through the needle ends up in the curing chamber rather than in the meat. In addition, because the needle is open at its distal end, a small plug of meat may enter the bore as the needle penetrates the meat and it is necessary to drive this plug out of the bore back into the meat before the fluid can be injected into the meat.

SUMMARY OF INVENTION

Injection needles which have an injection passage extending therethrough and which are closed at their outer end have been known for many years and have been used to inject pickle into meat such as ham. In these needles, the injection passages open laterally at the distal end of the needle. No provision has, however, been made for the closing of the discharge passage at the distal end of these needles and consequently, they are subject to the same disadvantages as the needles described in U.S. Pat. No. 4,356,762.

It is an object of the present invention to provide an injector needle assembly which has a discharge passage opening through the distal end of the needle and a valve for opening and closing the discharge passage.

It is a further object of the present invention to provide an injector needle assembly in which the discharge passage of the injection needles opens laterally from the bore and in which a valve member is slidably mounted in the needle to open and close the discharge passages.

It is another object of the present invention to provide an injector needle assembly which has a bore which extends therethrough to a discharge passage which is located at the distal end of the needle and a valve member slidably mounted in the bore for movement between a first position in which it closes the discharge passage and a second position in which it opens the discharge passage.

It is another object of the present invention to provide an injector needle assembly in which a plurality of hollow needles are mounted on a housing and project therefrom and in which a piston is slidably mounted in the housing and has a corresponding number of valve members mounted thereon, each of which cooperates with a bore of a needle to open and close the discharge passage of the needle in response to movement of the piston.

According to one aspect of the present invention, there is provided an injector needle assembly for injecting a fluid into a meat product comprising an injection needle having a proximal end and a distal end and a bore which extends from the proximal end to the distal end, discharge passage means opening through the needle from the bore at the distal end of the needle, a valve member slidably mounted on said needle for movement relative to the needle between a first position in which it closes the discharge passage to retain fluid within said needle and a second position in which it opens the discharge passage to permit fluid to be discharged therethrough onto the meat in use.

According to a further aspect of the present invention, there is provided an injector needle assembly for injecting a fluid into a meat product comprising a needle having a proximal end and a distal end and a bore which extends from the proximal end to a terminal point adjacent the distal end, the distal end of the needle being sharp so as to facilitate penetration of the meat product and closed to prevent the direct passage of meat into the bore when the needle is driven into the meat, discharge passage means opening laterally through the needle from the bore adjacent the distal end of the needle, said discharge passage means being spaced from the terminal point of the bore to form a sealing seat within the bore between the discharge passage means and the terminal point of the bore, a tubular valve member having an elongated body portion which has a distal end and a proximal end and an injection passage which extends through the bore from the proximal end to the distal end, the injection passage having an output opening at the distal end of the elongated body portion, said elongated body portion being mounted in said bore of said needle in a close-fitting, sliding relationship for telescopic movement relative to the needle between a contracted needle-closing position and an extended needle-opening position, said body portion having a sufficient length to permit the distal end thereof to be seated in said sealing seat when in said needle-closing position so as to cooperate therewith to prevent the discharge of fluid from the injection passage through the output opening of the valve member, said valve member being movable to said extended position to withdraw the distal end thereof from said sealing seat to a sufficient extent to permit fluid to pass through the output opening of the valve member and a discharge passage means of the needle to be injected into the meat product in use.

According to yet another aspect of the present invention, there is provided a needle injector assembly for injecting fluid into a meat product comprising a needle housing having a needle support wall, a plurality of needle mounting passages opening through said needle support wall, a cylinder within said housing, a piston assembly slidably mounted in said cylinder and having a first wall disposed opposite said needle support wall, said piston assembly being mounted for movement within said cylinder to move said first wall relative to said needle support wall between a first position closely adjacent and a second position spaced a greater distance from said needle support wall, a plurality of valve mounting passages opening through said first wall, each of said valve mounting passages being aligned with a needle mounting passage of said needle support wall, a plurality of needle assemblies each comprising a needle having a proximal end and a distal end and a bore which extends from the proximal end to the distal end, discharge passage means opening laterally through the needle from the bore at the distal end of the needle, the proximal end of said needle being mounted in one of said needle mounting passages of said needle support wall, a valve member having an elongated body portion which has a distal end and a proximal end, said proximal end of the valve member being mounted in one of said valve mounting passages of said first wall of said piston for movement with said piston, said valve member co-operating with said needle in response to movement of said piston assembly, to open and close said discharge passage.

According to a still further aspect of the present invention, there is provided an injector needle assembly for injecting fluid into a meat product comprising a needle housing having a needle support wall, a plurality of needle mounting passages opening through said needle support wall, a cylinder within said housing, a piston assembly slidably mounted in said cylinder and having a first wall disposed opposite said needle support wall, said piston assembly being mounted for movement within said cylinder to move said first wall relative to said needle support wall between a first position closely adjacent and a second position spaced a greater distance from said needle support wall, a plurality of valve mounting passages opening through said first wall, each of said valve mounting passages being aligned with a needle mounting passage of said needle support wall, a plurality of needle assemblies each comprising a needle having a proximal end and a distal end and a bore which extends from the proximal end to a terminal point adjacent the distal end, the distal end of the needle being sharp so as to facilitate penetration of the meat product and closed to prevent the direct passage of meat into the bore when the needle is driven into the meat, discharge passage means opening laterally through the needle from the bore adjacent the distal end of the needle, said discharge means being spaced from the terminal point of the bore to form a sealing seat within the bore between the discharge passage means and the terminal point of the bore, the proximal end of said needle being mounted in one of said needle mounting passages of said needle support wall, a tubular valve member having an elongated body portion which has a distal end and a proximal end and an injection passage which extends through the bore from the proximal end to the distal end, the injection passage having an output opening at the distal end of the elongated body portion, said proximal end of the valve member being mounted on the valve mounting passages which is aligned with its needle mounting passage, said elongated body portion being mounted in said bore of said needle in a close-fitting, sliding relationship for telescopic movement relative to the needle in response to movement of the piston assembly between a contracted needle-closing position and an extended needle-opening position, said body portion having a sufficient length to permit the distal end thereof to be seated in said sealing seat when in said needle-closing position so as to cooperate therewith to prevent the discharge of fluid from the injection passage through the output opening of the valve member, said valve member being movable to said extended position to withdraw the distal end thereof from said sealing seat to a sufficient extent to permit fluid to pass through the output opening of the valve member and a discharge passage means of the needle to be injected into the meat product in use.

According to yet another aspect of the present invention, there is provided in a meat curing machine of the type having a meat curing chamber in which fluid is injected into pieces of meat and in which a vacuum pump draws a vacuum in the vacuum chamber during the fluid injection process, the improvement of an injector assembly for injecting fluid into a meat product comprising a needle housing having a needle support wall which forms a wall of said curing chamber, a plurality of needle mounting passages opening through said needle support wall, a piston assembly slidably mounted in said cylinder, for movement within said cylinder relative to said needle support wall and between a first position in which the piston is located closely adjacent said needle support wall and a second position in which the piston is spaced a greater distance from said needle support wall, a plurality of needles each having a proximal end and a distal end and a bore which extends from the proximal end to the distal end, discharge passage means opening from the bore at the distal end of the needle, the proximal end of said needle being mounted on said needle support wall and projecting into said curing chamber, a valve member associated with each needle, each valve member being mounted on said piston and co-operating with its associated needle to open and close the discharge passage means of its associated needle in response to movement of said piston assembly between said first position and said second position.

According to a still further aspect of the present invention, there is provided a method a method of injecting fluid into a body of meat in a meat curing machine comprising the steps of tumbling a plurality of meat portions within a tumbling chamber and impaling the meat portions on injection needles which have a fluid discharge passage opening therethrough which is closed when the meat is initially impaled thereon, opening the discharge passage of the injection needle and injecting fluid through the discharge passage of the needle into a body of meat, closing the discharge passage of the injection needle and thereafter, removing the portion of meat from the needles.

The invention will be more clearly understood after reference to the following detailed specification read in conjunction with the drawings wherein.

Figure 1:
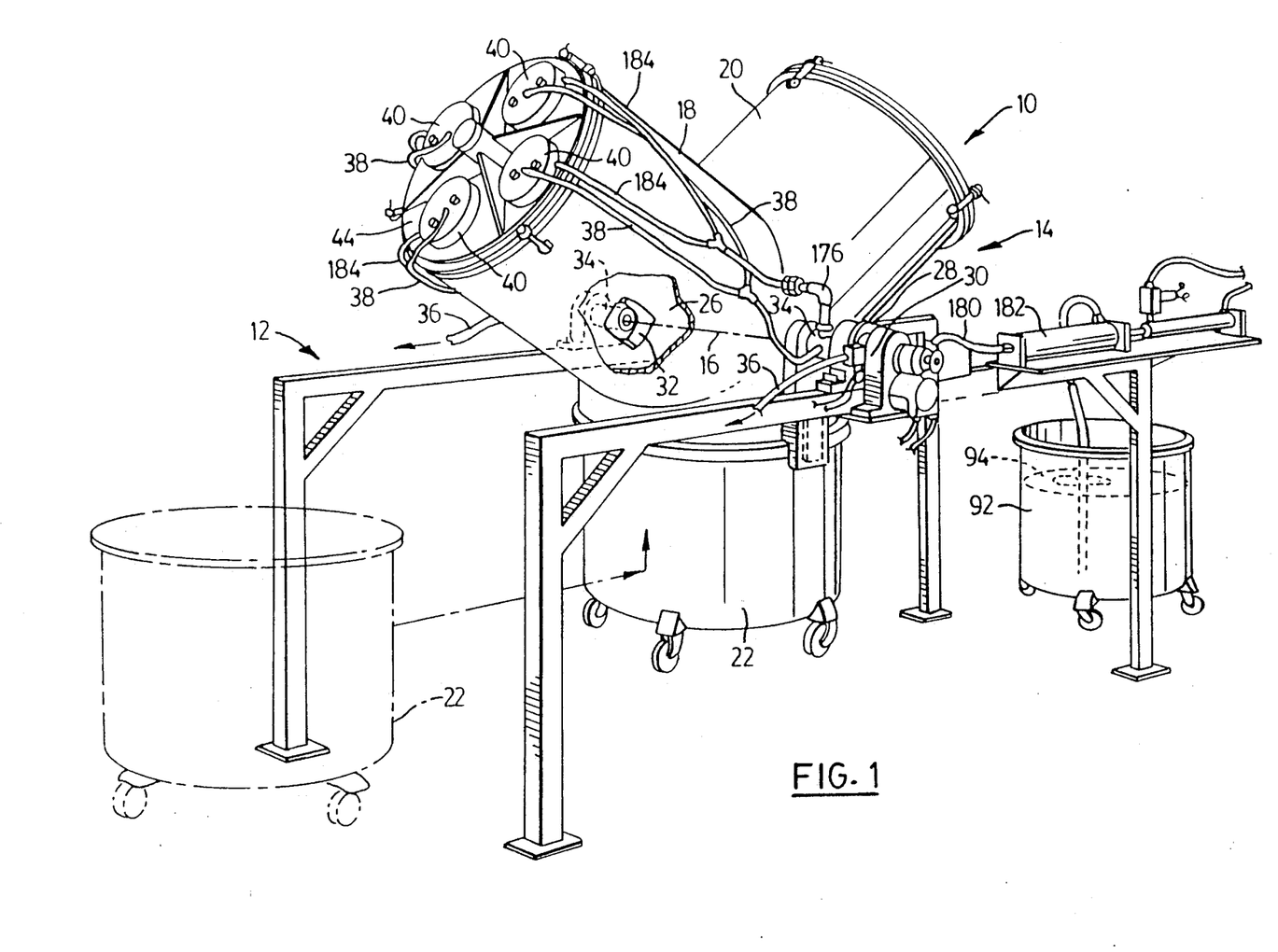
FIG. 1 is a pictorial view of a meat curing machine constructed in accordance with an embodiment of the present invention.

With reference to the drawings, the reference numeral 10 refers generally to a meat curing machine constructed in accordance with an embodiment of the present invention. The meat curing machine comprises a frame 12 upon which a housing 14 is mounted for rotation about a tumbling axis 16. The housing 14 comprises first and second tanks 18 and 20 and a detachable wagon 22. A tumbling chamber 24 is formed within the housing 14. The tumbling chamber 24 includes a first compartment 26 which is formed within the first tank 18.

Vacuum passages 32 open into the tumbling chamber 24 through each of the support shafts 34 on which the housing 14 is mounted for rotation. The vacuum passages 32 are connected to a suitable vacuum source such as a vacuum pump through control valves 28, the operation of which is regulated by a solenoid 30. The solenoid 30 serves to control the application of the vacuum so that a vacuum can be drawn in the tumbling chamber 24 alone or in the tumbling chamber 24 and in the vacuum chamber of the injection heads 40 as will be described hereinafter.

The injection fluid 94 is withdrawn from the holding tank 92 and is pumped by means of a pump 182 through conduits 180, 176 and 184 to each injection head 40.

The assembly is rotatably driven as described in U.S. Pat. No. 4,356,762 to cause the meat portions to tumble within the tumbling chamber to be sequentially impaled on and removed from the injection needles.

As shown in FIG. 1 of the drawings, a plurality of injection heads 40 are mounted on the end closure wall of the tank 18.

Figure 2:
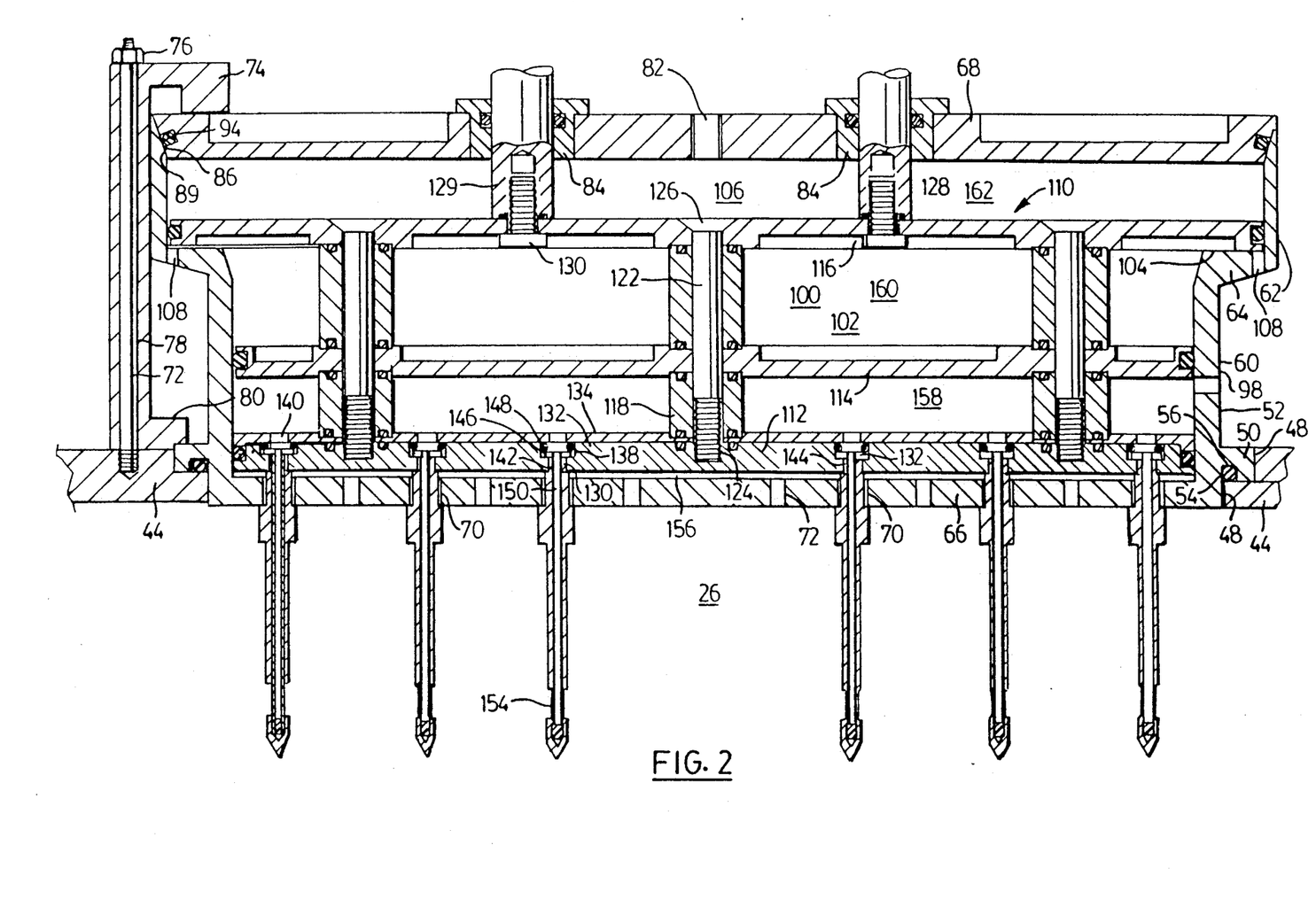
FIG. 2 is a sectional side view of an injection head of the meat curing machine of FIG. 1.

An injection head 40 will now be described with reference to FIG. 2 of the drawings. As shown in FIG. 2 of the drawings, the injection head 40 is mounted in an opening 42 which is formed in the end plate 44. A recess 48 is formed in the end plate 44 into which a shoulder portion 50 of the housing 52 extends. A channel 54 is provided in the shoulder 50 and a sealing ring 56 is located in the channel 54.

The housing 54 has a cylindrical-shaped side wall which is generally identified by the reference numeral 58. The side wall 58 has a lower portion 60 and an upper portion 62. The upper portion 62 has a greater diameter than the lower portion 58 and a shoulder 64 extends radially outwardly from the lower portion 60 to the upper portion 62.

The housing 52 also has a needle support wall 66 at one end thereof which forms a wall of the curing chamber. The housing also has a detachable back wall 68 which is mounted opposite the needle support wall.

A plurality of needle mounting passages 70 extend through the needle support wall 66. A plurality of vacuum passages 72 also extend through the needle support wall 66.

Mounting posts 72 are threadedly mounted in the end plate 44 and have a clamping sleeve 78 mounted thereon which has an upper clamping jaw 74 and a lower clamping jaw 80. A clamping nut 76 is threadedly mounted at the upper end of the posts 72. When the nut is tightened, it will cause the upper clamping jaw 74 and lower clamping jaw 80 to bear against the top wall 68 and the shoulder portion 50 respectively of the injector heads 40 to retain the rejector heads on the end plate 44.

The back wall 68 is a vacuum passage 82 which opens therethrough which communicates with the vacuum conduit 38 (FIG.1). The back wall 68 also has bushes 84 mounted therein. The outer peripheral edge portion 86 of the back wall is tapered and fits in a close-fitting sealing relationship with the correspondingly tapered end portion 88 of the side wall 58. A sealing ring 94 serves to provide an air-tight seal between the back wall 68 and the side wall 52.

A housing 52 has a cylinder 100 formed therein which has a first portion 102 which extends from the needle support wall 66 to the upper end of the lower portion 60 of the housing at which point an end face 104 extends radially outwardly. A second portion 106 of the cylinder 100 extends from the end face 104 to the back wall 68. The cross-sectional area of the second portion 106 is greater than the cross-sectional area of the first portion 102. Vent passages 108 open through the shoulders 64 into the second portion 106 of the cylinder. A fluid input passage 98 opens through the cylindrical side wall 58 into the first portion 102 of the cylinder and is connected to a conduit 184.

A piston assembly generally identified by the reference numeral 110 is mounted in each cylinder. The piston assembly has a first wall 112, a second wall 114 and a third wall 116. The walls 112, 114 and 116 are retained in a fixed spaced relationship by spacer sleeves 118, 120 and clamping bolts 122. The clamping bolts 122 have a threaded end portion 124 which is threadedly mounted in the first wall 114 and an enlarged head portion 126 which bears against the third wall 116.

Alignment posts 128 are secured to the third wall 116 by means of mounting bolts 130 and extend through the bushes 84. The alignment posts 128 serve to maintain alignment of the piston assembly as it reciprocates to and fro in the cylinder 100.

The first wall 112 is a compound wall which comprises a lower plate 132 and an upper plate 134. The lower plate 132 has valve mounting passages 136 formed therein which are arranged in alignment with the needle mounting passages 70. The valve mounting passages 136 have a recessed upper end portion 138. The upper plate 134 has a through passage 140 which is aligned with the passage 136.

Figure 3:
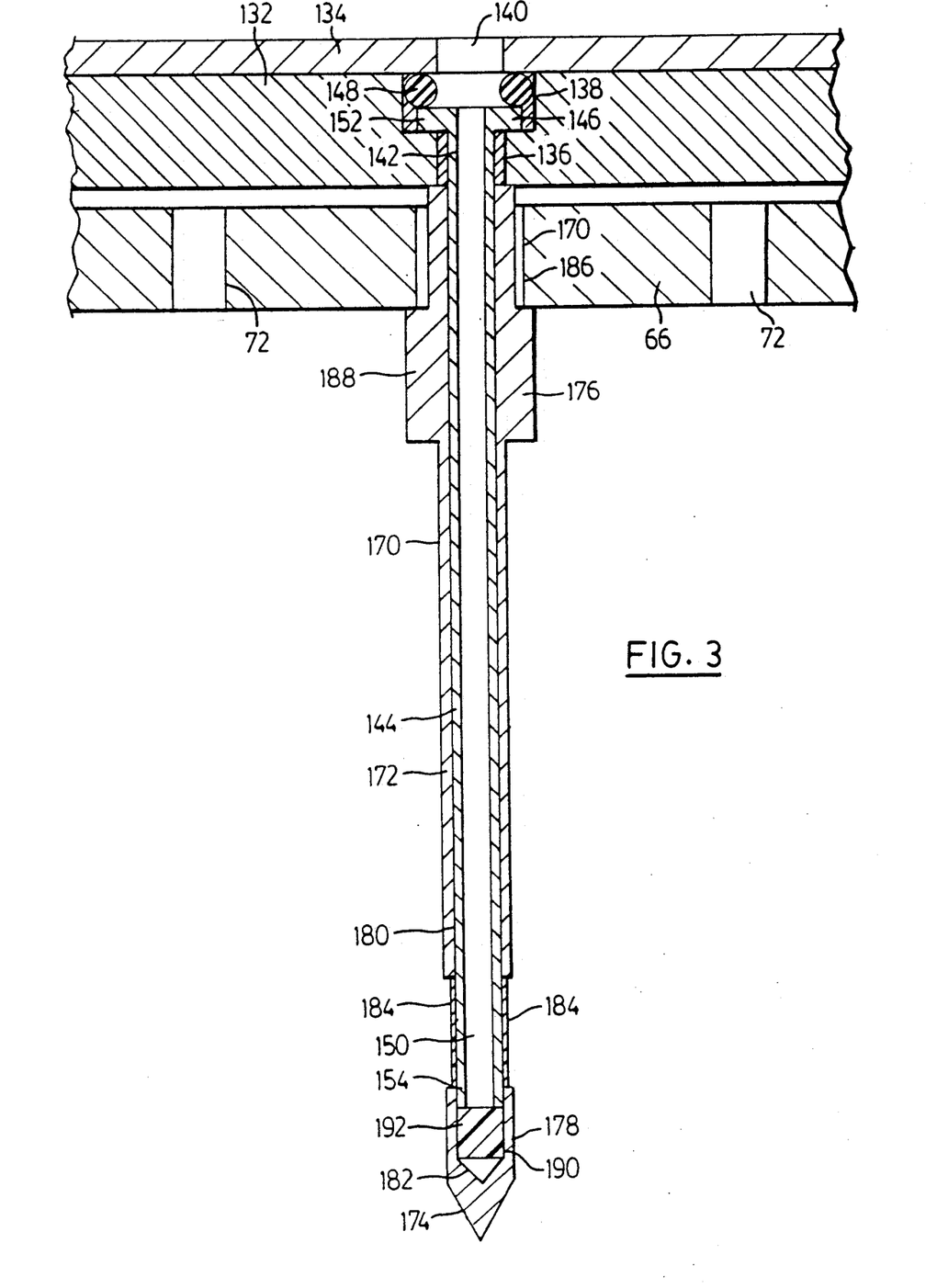
FIG. 3 is an enlarged sectional elevation of the needle assembly of FIG. 2.

As more clearly illustrated in FIG. 3 of the drawings, a valve member 142 has its proximal end portion 152 mounted in each valve mounting passage 136. The valve member 142 also has a distal end portion 154 and a bore 150 which extends from the proximal end to the distal end thereof and acts as a discharge passage for fluid. The valve 142 has a tubular body portion 144 and an enlarged head portion 146. The enlarged head portion 146 is mounted in the recessed upper end portion 138 of the lower plate 132 and a sealing ring 148 is clamped between the head portion 146 and the upper plate 134.

Referring once more to FIG. 2 of the drawings, it will be seen that when the piston assembly 110 is mounted in the cylinder 100, the first wall 112 and the second wall 114 are slidably mounted within the first portion 102 and the third wall 114 is slidably mounted within the second portion 106 of the cylinder 100. The first wall 112, second wall 114 and third wall 116 serve to divide the cylinder 100 to form a first compartment 156, a second compartment 158, a third compartment 160 and a fourth compartment 162. The first compartment 156 forms a first vacuum compartment which is located between the needle support wall 66 and the first wall 112. The vacuum passages 72 serve to place the first vacuum compartment 156 in communication with the first compartment 26 of the first tank 18 with the result that the vacuum which is applied to the tumbling chamber 24 is also applied to the first compartment 156 of the housing. The second compartment 158 forms a reservoir for the fluid which is to be injected and communicates with the source of fluid through the input passage 98 and the conduit 184. The third compartment 160 is vented to atmosphere through the vent passages 108. The fourth compartment 106 is a vacuum compartment which communicates with the vacuum source through the vacuum passages 82 and the vacuum conduits 38. Because of the difference in the cross-sectional area of the third wall 116 and the first wall 114, the application of the same vacuum to the first compartment 156 and the fourth compartment 162 will result in the movement of the piston away from the first position shown in FIG. 2 to a second position in which the first wall 112 is spaced a greater distance from the needle support wall 66. When the vacuum is removed from the fourth compartment 162, the vacuum which is applied to the first compartment 156 will serve to return the piston assembly to its first position illustrated in FIG. 2. The control valve 28 and solenoid 30 operate to selectively apply and move the vacuum from the fourth compartment 162.

The needle assembly 170 will now be described with reference to FIG. 3 of the drawings. As shown in FIG. 3, each needle assembly 170 comprises a needle 172 and a valve member 142. The needle 172 has a proximal end 176 and a distal end 178. A bore 180 extends from the proximal end 176 to the distal end 178. The bore 180 has a closed lower end 182. Discharge passages 184 extend laterally from the bore 180. The needle 176 has a pointed lower end 174. The needle 172 also has a threaded upper end portion 186 which is threadedly mounted in the needle mounting passage 170 of the needle support plate 66. The head portion 188 of the needle bears against the needle support plate 66. A recess 190 is formed at the distal end of the bore 180 of the needle and a valve seat in the form of a resilient plug 192 is located in the recess 190.

The tubular body portion 144 of the valve member 142 is slidably mounted in the bore 180 of its associated needle for movement between a first position shown in FIG. 3 in which the distal end 154 of the valve member bears against the valve seat 192 such that the end of the discharge passage 150 is closed. In this same position, the distal end portion 154 of the tubular body portion 144 of the valve member serves to close the discharge passages 184 of the needle. When the piston is moved from its first position to its second position as previously described, the valve member 144 is caused to slide within the bore 180 until it is withdrawn to a sufficient extent to unseat the distal end portion to open the discharge passage 150 and to open the discharge passages 184 so that the fluid can pass from the second compartment 158 through the bore 150 and discharge passages 184 into a body of a portion of meat impaled on the needle 172 in use. When the piston is returned to its first position, the valve member will again slide relative to the needle in order to return to the closed position shown in FIG. 3 to interrupt the flow of fluid. It will be noted that because the discharge passages 184 are located at the distal end of the needle and that these passages are closed by the valve member 142, any fluid which is located within the bore 150 at the time when the valve member is closed will remain in the bore until the cycle is repeated and the valve is reopened. Furthermore, because the discharge passages 184 which are formed in the needle are closed by the valve member when the initial tumbling action causes the meat product to be impaled on the needles, the bore 150 is not exposed to the body of the meat when the needle is driven into the meat and consequently, it will not become clogged with meat.

In use, the movement of the piston assembly relative to the housing is controlled by the application and removal of vacuum from the fourth compartment 162 as previously described. This is achieved by operation of the solenoid 130 which in turn is controlled by a suitable cam mounted on the support shaft of the housing 14 in a like manner to the cam and switch assembly used for controlling the injection pump described in U.S. Pat. No. 4,356,762.

From the foregoing, it will be apparent that the present invention provides an apparatus which facilitates the injection of fluid such as pickling fluid or meat paste into a body of meat.

We claim:

1. An injection needle assembly for injecting a fluid into a meat product comprising:
   (a) an injection needle having a proximal end and a distal end and a bore which extends from the proximal end to the distal end,
   (b) discharge passage means opening through the needle from the bore at the distal end of the needle,
   (c) a valve member slidably mounted in the bore of said needle for movement relative to the needle between a first position in which it closes the discharge passage to retain fluid within said needle and a second position in which it opens the discharge passage to permit fluid to be discharged therethrough into the meat in use.

2. An injection needle assembly as claimed in claim 1, wherein a sealing seat is located in said bore at the distal end of said needle, said valve member having an injection passage opening therethrough which has an output opening which is closed by said sealing seat when the valve member is in said first position.

3. An injection needle assembly as claimed in claim 1, wherein said valve member comprises an elongated tubular body which has a proximal end and a distal end and an injection passage which extends therethrough and has an output opening at the distal end thereof.

4. An injection needle assembly as claimed in claim 3, wherein the bore of said needle has an open end at the proximal end and a closed end at the distal end thereof, said bore having a terminal end at the distal end which extends beyond the discharge passage means to form a sealing seat within the bore between the terminal end and the discharge passage means, said sealing seat cooperating with the valve member to close the output opening of said injection passage.

5. An injection needle assembly as claimed in claim 4, wherein said sealing seat further comprises a resilient seal member mounted in said bore and arranged to bear against the distal end of the tubular body to close the output opening as aforesaid.

6. An injection needle assembly for injecting a fluid into a meat product comprising:
   (a) a needle having a proximal end and a distal end and a bore which extends from the proximal end to a terminal point adjacent the distal end, the distal end of the needle being sharp so as to facilitate penetration of the meat product and closed to prevent the direct passage of meat into the bore when the needle is driven into the meat, discharge passage means opening laterally through the needle from the bore adjacent the distal end of the needle, said discharge passage means being spaced from the terminal point of the bore to form a sealing seat within the bore between the discharge passage means and the terminal point of the bore,
   (b) a tubular valve member having an elongated body portion which has a distal end and a proximal end and an injection passage which extends through the bore from the proximal end to the distal end, the injection passage having an output opening at the distal end of the elongated body portion, said elongated body portion being mounted in said bore of said needle in a close-fitting, sliding relationship for telescopic movement relative to the needle between a contracted needle-closing position and an extended needle-opening position, said body portion having a sufficient length to permit the distal end thereof to be seated in said sealing seat when in said needle-closing position so as to cooperate therewith to prevent the discharge of fluid from the injection passage through the output opening of the valve member, said valve member being movable to said extended position to withdraw the distal end thereof from said sealing seat to a sufficient extent to permit fluid to pass through the output opening of the valve member and a discharge passage means of the needle to be injected into the meat product in use.

7. An injection needle assembly as claimed in claim 6, further comprising a resilient seating member located in said sealing seat so as to be disposed opposite the distal end of the tubular valve member to bear against the distal end of the valve member when it is in said contracted needle-closing position.

8. A needle injection assembly as claimed in claim 6, wherein said discharge passage means of said needle comprises a pair of discharge passages which open laterally from opposite sides of the needle.

9. An injection needle assembly as claimed in claim 7, wherein said resilient seating member is in the form of a plug which is located in said bore in a close-fitting relationship.

10. An injector assembly for injecting fluid into a meat product comprising;
 (a) a needle housing having a needle support wall, a plurality of needle mounting passages opening through said needle support wall,
 (b) a cylinder within said housing,
 (c) a piston assembly slidably mounted in said cylinder and having a first wall disposed opposite said needle support wall, said piston assembly being mounted for movement within said cylinder to move said first wall relative to said needle support wall between a first position closely adjacent and a second position spaced a greater distance from said needle support wall, a plurality of valve mounting passages opening through said first wall, each of said valve mounting passages being aligned with a needle mounting passage of said needle support wall,
 (d) a plurality of needle assemblies each comprising;
  (i) a needle having a proximal end and a distal end and a bore which extends from the proximal end to the distal end, discharge passage means opening laterally through the needle from the bore at the distal end of the needle, the proximal end of said needle being mounted in one of said needle mounting passages of said needle support wall,
  (ii) a valve member having an elongated body portion which has a distal end and a proximal end, said proximal end of the valve member being mounted in one of said valve mounting passages of said first wall of said piston for movement with said piston, said valve member co-operating with said needle in response to movement of said piston assembly, to open and close said discharge passage.

11. An injector assembly as claimed in claim 10 wherein said elongated body portion of said valve member is slidably mounted in the bore of the needle with which it co-operates such that the distal end of the valve member serves to open and close the discharge passage in use.

12. An injector assembly as claimed in claim 10, wherein a sealing seat is located in said bore at the distal end of said needle, said valve member having an injection passage opening therethrough which has an output opening which is closed by said sealing seat when the valve member is in said first position.

13. An injector assembly as claimed in claim 10 wherein said bore of said needle is closed at the distal end of the needle and said discharge passage means opens laterally from said bore.

14. An injector assembly as claimed in claim 13 wherein the valve member has an injection passage which extends therethrough from its proximal end to its distal end.

15. An injector assembly as claimed in claim 14 wherein the bore of said needle has an open end at the proximal end and a closed end at the distal end thereof, said bore having a terminal end at the distal end which extends beyond the discharge passage means to form a sealing seat within the bore between the terminal end and the discharge passage means, said sealing seat cooperating with the valve member to close the output opening of said injection passage.

16. An injector assembly as claimed in claim 14 wherein said sealing seat further comprises a resilient seal member mounted in said bore and arranged to bear against the distal end of the tubular body to close the output opening as aforesaid.

17. An injector assembly for injecting fluid into a meat product comprising;
 (a) a needle housing having a needle support wall, a plurality of needle mounting passages opening through said needle support wall,
 (b) a cylinder within said housing,
 (c) a piston assembly slidably mounted in said cylinder and having a first wall disposed opposite said needle support wall, said piston assembly being mounted for movement within said cylinder to move said first wall relative to said needle support wall between a first position closely adjacent and a second position spaced a greater distance from said needle support wall, a plurality of valve mounting passages opening through said first wall, each of said valve mounting passages being aligned with a needle mounting passage of said needle support wall,
 (d) a plurality of needle assemblies each comprising;
  (i) a needle having a proximal end and a distal end and a bore which extends from the proximal end to a terminal point adjacent the distal end, the distal end of the needle being sharp so as to facilitate penetration of the meat product and closed to prevent the direct passage of meat into the bore when the needle is driven into the meat, discharge passage means opening laterally through the needle from the bore adjacent the distal end of the needle, said discharge means being spaced from the terminal point of the bore to form a sealing seat within the bore between the discharge passage means and the terminal point of the bore, the proximal end of said needle being mounted in one of said needle mounting passages of said needle support wall,
  (ii) a tubular valve member having an elongated body portion which has a distal end and a proximal end and an injection passage which extends through the bore from the proximal end to the distal end, the injection passage having an output opening at the distal end of the elongated body portion, said proximal end of the valve member being mounted on the valve mounting passages which is aligned with its needle mounting passage, said elongated body portion being mounted in said bore of said needle in a close-fitting, sliding relationship for telescopic movement relative to the needle in response to movement of the piston assembly between a contracted needle-closing position and an extended needle-opening position, said body portion having a sufficient length to permit the distal end thereof to be seated in said sealing seat when in said needle-closing position so as to cooperate therewith to prevent the discharge of fluid from the injection passage through the output opening of the valve member, said valve member being movable to said extended position to withdraw the distal end thereof from said sealing seat to a sufficient extent to permit fluid to pass through the output opening of the valve member and a discharge passage means of the needle to be injected into the meat product in use.

18. An injector assembly for injecting fluid into a meat product comprising;
   (a) a needle housing having a needle support wall, a back wall disposed opposite the needle support wall and a side wall extending from the needle support wall to the back wall, a plurality of needle mounting passages opening through said needle support wall,
   (b) a cylinder within said housing, said cylinder having a first portion which extends from said needle support wall which has a first cross-sectional area and a second portion which extends from said first portion to the back wall, said second portion having a greater cross-sectional area than said first section,
   (c) a piston assembly comprising;
      (i) first, second and third walls which are secured to one another in a spaced relationship, said piston being mounted within said cylinder with the first and second walls slidably within said first portion and the third wall slidable within said second portion, said first, second and third walls dividing said cylinder into first, second, third and fourth compartments, said first compartment being a first vacuum compartment which is located between said needle support wall and said first wall of said piston, said second compartment being an injection fluid storage compartment which is located between said first and second walls of said piston, said third compartment being a vented compartment which is vented to atmosphere and is located between said second and third walls of said piston, said fourth compartment being a second vacuum compartment which located between said third wall of said piston and said back wall of said cylinder, said piston assembly being mounted for movement within said cylinder relative to said needle support wall and said back wall between a first position in which the first wall of the piston is located closely adjacent said needle support wall and a second position in which the first wall of the piston is spaced a greater distance from said needle support wall,
      (ii) a plurality of valve mounting passages opening through said first wall, each of said valve mounting passages being aligned with a needle mounting passage of said needle support wall,
   (d) first vacuum passage means opening from said housing and communicating with said first vacuum compartment,
   (e) second vacuum passage means opening from said housing and communicating with said second vacuum compartment,
   (e) first vent passage means opening from said housing and communicating with said vented compartment,
   (f) fluid input passage means opening from said housing and communicating with said injection fluid storage compartment,
   (g) a plurality of needle assemblies each comprising;
      (i) a needle having a proximal end and a distal end and a bore which extends from the proximal end to the distal end, discharge passage means opening laterally through the needle from the bore at the distal end of the needle, the proximal end of of said needle being mounted in one of said needle mounting passages of said needle support wall,
      (ii) a valve member having an elongated body portion which has a distal end and a proximal end, said proximal end of the valve member being mounted in one of said valve mounting passages of said first wall of said piston and co-operating with said needle to open and close said discharge passage, in response to movement of said piston assembly between its first position and its second position.

19. In a meat curing machine of the type having a meat curing chamber in which fluid is injected into pieces of meat and in which a vacuum pump draws a vacuum in the vacuum chamber during the fluid injection process, the improvement of an injector assembly for injecting fluid into a meat product comprising;
   (a) a needle housing having a needle support wall which forms a wall of said curing chamber, a back wall disposed opposite the needle support wall and a side wall extending from the needle support wall to the back wall, a plurality of needle mounting passages opening through said needle support wall,
   (b) a cylinder within said housing, said cylinder having a first portion which extends from said needle support wall which has a first cross-sectional area and a second portion which extends from said first portion to the back wall, said second portion having a greater cross-sectional area than said first section,
   (c) a piston assembly comprising;
      (i) first, second and third walls which are secured to one another in a spaced relationship, said piston being mounted within said cylinder with the first and second walls slidably within said first portion and the third wall slidable within said second portion, said first, second and third walls dividing said cylinder into first, second, third and fourth compartments, said first compartment being a first vacuum compartment which is located between said needle support wall and said first wall of said piston, said second compartment being an injection fluid storage compartment which is located between said first and second walls of said piston, said third compartment being a vented compartment which is vented to atmosphere and is located between said second and third walls of said piston, said fourth compartment being a second vacuum compartment which located between said third wall of said piston and said back wall of said cylinder, said piston assembly being mounted for movement within said cylinder relative to said needle support wall and said back wall between a first position in which the first wall of the piston is located closely adjacent said needle support wall and a second position in which the first wall of the piston is spaced a greater distance from said needle support wall,     (ii) a plurality of valve mounting passages opening through said first wall, each of said valve mounting passages being aligned with a needle mounting passage of said needle support wall, (d) a plurality of needle assemblies each comprising;

(i) a needle having a proximal end and a distal end and a bore which extends from the proximal end to the distal end, discharge passage means opening laterally through the needle from the bore at the distal end of the needle, the proximal end of of said needle being mounted in one of said needle mounting passages of said needle support wall,     (ii) a valve member associated with each needle, each valve member having an elongated body portion which has a distal end and a proximal end, said proximal end being mounted in one of said valve mounting passages of said first wall of said piston and co-operating with its associated needle to open and close this discharge passage means of its associated needle in response to movement of said piston assembly between said first position and said second position.

(e) first vacuum passage means opening from said first vacuum compartment into said meat curing chamber, (f) second vacuum passage means opening from said second vacuum compartment and communicating with said vacuum source such that when the vacuum draws a vacuum in said second vacuum compartment, the piston assembly will move to its second position to open said discharge passage means of the needles and when the vacuum source does not draw a vacuum in the second vacuum compartment, the vacuum which is drawn in the vacuum chamber will move the piston assembly to its first position to close the discharge passage means of the needles, (g) first vent passage means opening from said housing and communicating with said vented compartment.

(h) fluid input passage means opening from said housing and communicating with said injection fluid storage compartment.

* * * * *